Sept. 15, 1959   J. P. HAMILTON   2,904,297
PALLET
Filed July 5, 1957   6 Sheets-Sheet 1
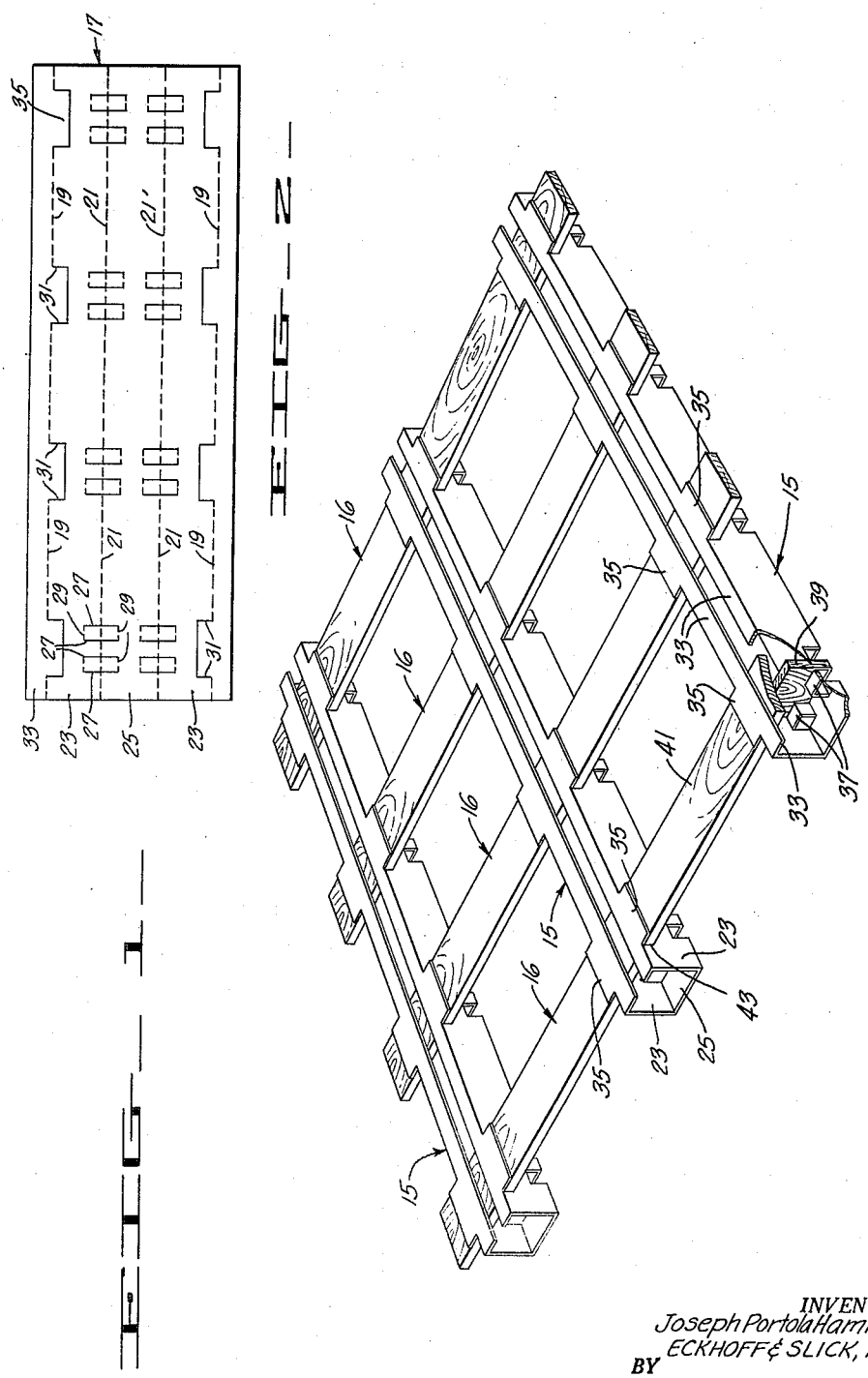
INVENTOR.
Joseph Portola Hamilton
BY ECKHOFF & SLICK, Attys.
A member of the firm.

Sept. 15, 1959  J. P. HAMILTON  2,904,297
PALLET
Filed July 5, 1957  6 Sheets-Sheet 2
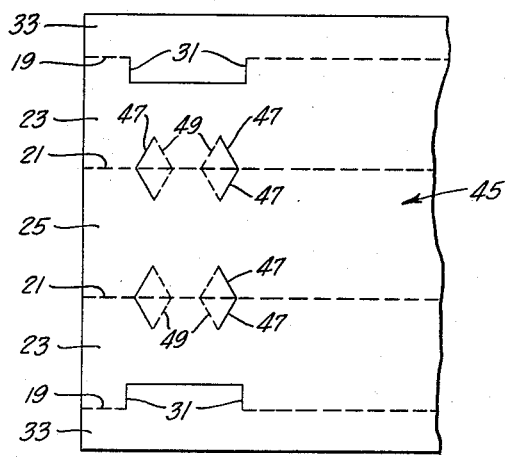
FIG_3_
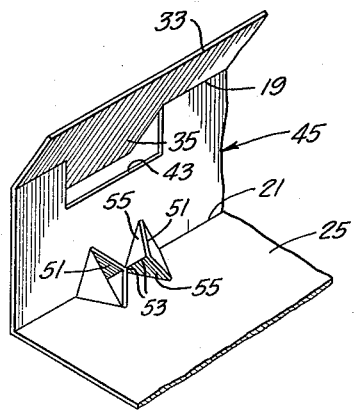
FIG_4_
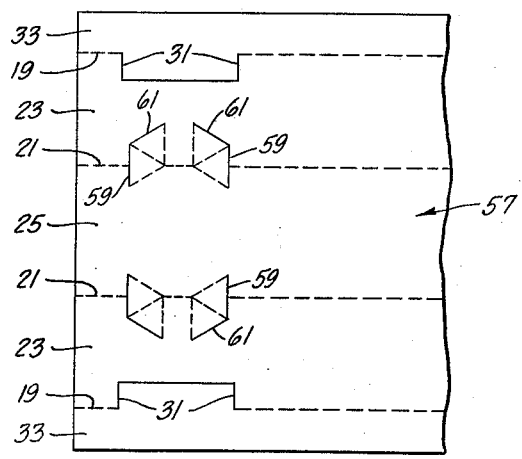
FIG_5_
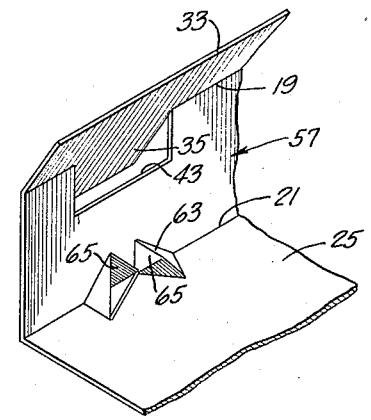
FIG_6_
INVENTOR.
Joseph Portola Hamilton
BY ECKHOFF & SLICK, Attys.
A member of the firm Sept. 15, 1959  J. P. HAMILTON  2,904,297
PALLET
Filed July 5, 1957  6 Sheets-Sheet 3
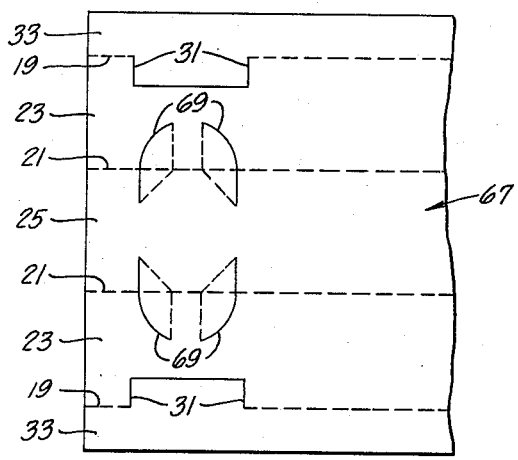
FIG_7_
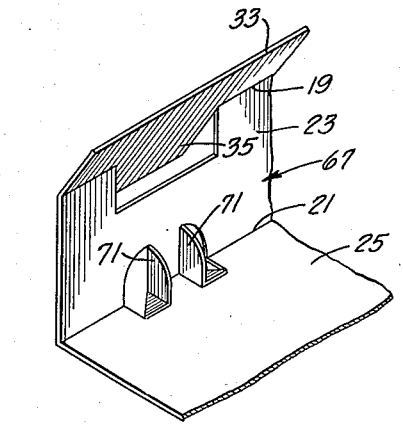
FIG_8_
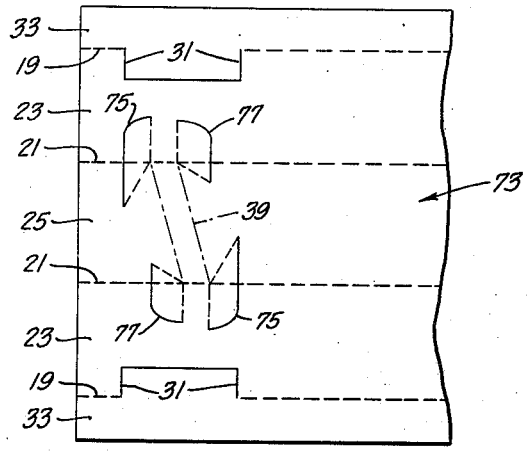
FIG_9_
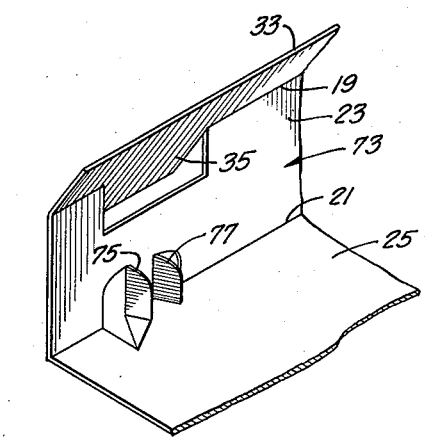
FIG_10_
INVENTOR.
Joseph Portola Hamilton
BY ECKHOFF & SLICK, Attys.
A member of the firm

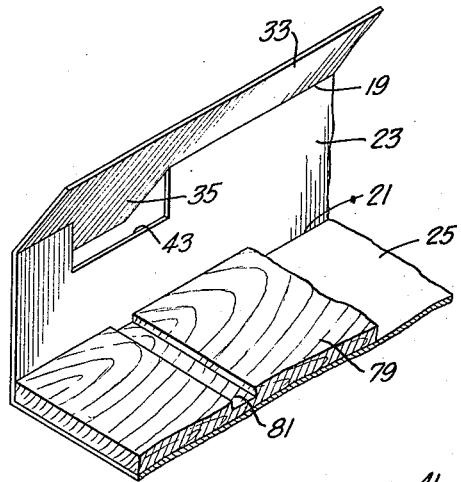
FIG_11
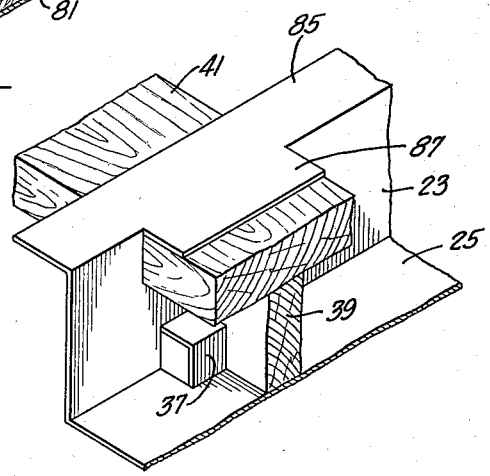
FIG_12
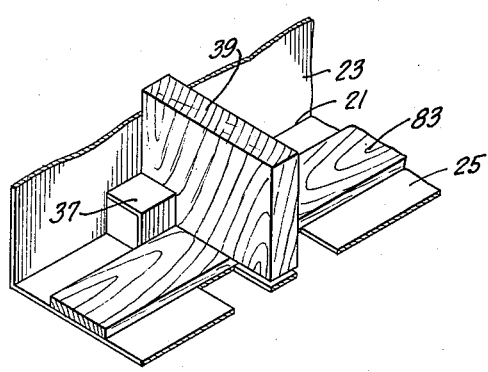
FIG_13

Sept. 15, 1959     J. P. HAMILTON     2,904,297
PALLET
Filed July 5, 1957                                  6 Sheets-Sheet 5
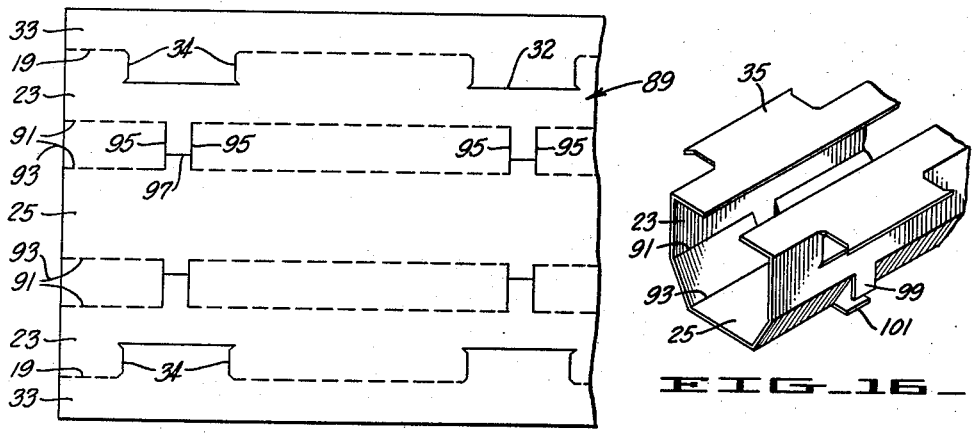
FIG_15_
FIG_16_
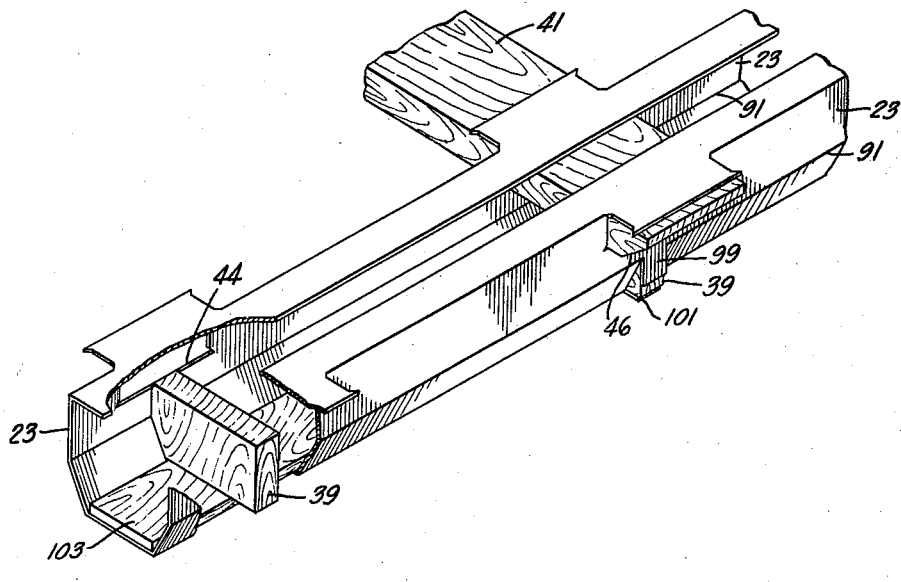
FIG_14_
INVENTOR.
Joseph Portola Hamilton
BY ECKHOFF & SLICK, Attys.
A member of the firm Sept. 15, 1959      J. P. HAMILTON      2,904,297
PALLET
Filed July 5, 1957      6 Sheets-Sheet 6
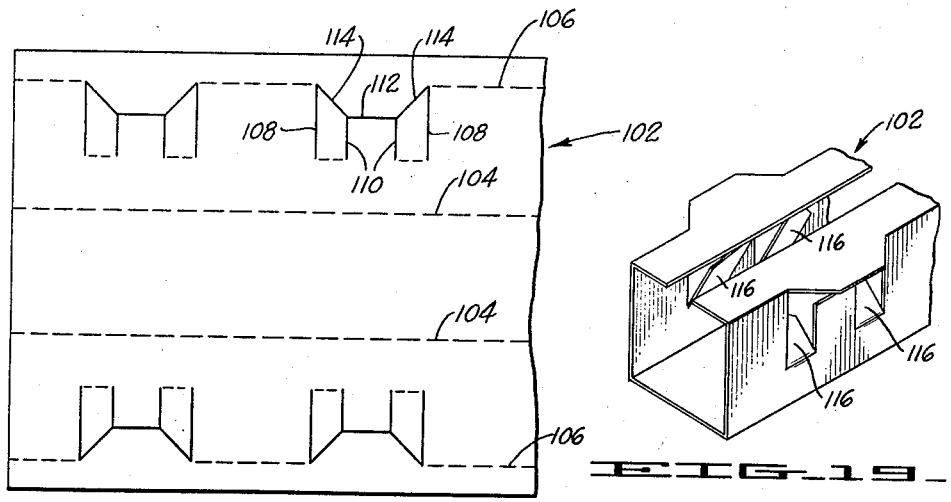
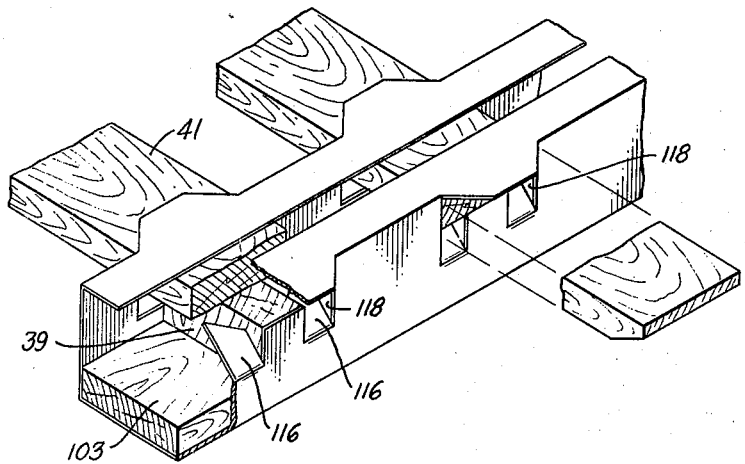
INVENTOR.
Joseph Portola Hamilton
BY ECKHOFF & SLICK, Attys.
A member of the firm.

2,904,297
PALLET

Joseph Portola Hamilton, Oakland, Calif., assignor to Charles Dreifus, Jr.

Application July 5, 1957, Serial No. 670,346

8 Claims. (Cl. 248—120)

This invention relates to a pallet or skid and, more particularly, relates to a pallet or skid made of a combination of wooden and cardboard elements.

It is one object of my invention to provide a pallet or skid of knocked-down construction which is made of a combination of wooden and cardboard elements.

Another object of this invention is to provide a pallet or skid which easily lends itself to being assembled by means of a machine.

Another object of this invention is to provide a pallet or skid which is strong, light weight, and made of inexpensive materials.

Still another object of this invention is to provide a disposable pallet wherein certain of the elements can be salvaged and shipped in small space while other elements may be easily replaced.

Another object of this invention is to provide a pallet or skid which forms a strong structure without the use of any type of securing means such as nails, wires, stitches, staples, adhesive and the like.

Still another object of this invention is to provide a pallet or skid which is inexpensive to store and ship and which lends itself to being stored or shipped in unassembled form in a minimum amount of space.

Another object of this invention is to provide a pallet or skid having wood supporting columns utilizing a minimum amount of wood, yet allowing the maximum utilization from the wood since the wood is loaded in compression.

Another object is to provide a pallet or skid wherein the posts and stringers are locked together utilizing the runners as a ratchet.

Still another object is to provide a cardboard blank which is adapted to be formed into a pallet runner.

Further objects will be apparent to the reader from the balance of the specification.

In the foregoing, it was mentioned that the pallet could be made of a combination of wood and cardboard members. By "cardboard," I refer to materials such as solid fiber, corrugated board, V-board, chipboard, and the like. Instead of wood, one can use various materials having wood-like characteristics such as composition boards, such as wood veneer lined with paper, plastics, etc.

In the drawings forming a part of this application:

Figure 1 is a perspective view of a complete pallet, partly in section, showing one embodiment of the present invention.

Figure 2 is a reduced plan view of the blank from which the runners of the pallet in Figure 1 have been constructed.

Figure 3 is a fragmentary plan view of a blank for an alternate form of runner.

Figure 4 is a fragmentary perspective view showing the method of assembly of the blank of Figure 3.

Figure 5 is a fragmentary plan view of a runner blank showing another embodiment of my invention.

Figure 6 is a fragmentary perspective view showing the method of assembly of the blank shown in Figure 5.

Figure 7 is a fragmentary plan view of a blank used in another embodiment of my invention.

Figure 8 is a partial perspective view showing the method of assembly of the blank shown in Figure 7.

Figure 9 is a fragmentary plan view of a blank used in forming the runner of another embodiment of my invention.

Figure 10 is a fragmentary perspective view showing the method of assembly of the blank shown in Figure 9.

Figure 11 is a partial perspective view of a runner showing the use of a rabbeted wood strip within a runner.

Figure 12 is a partial perspective view showing an alternate form of assembly of the top structure of a runner and stringer.

Figure 13 is a fragmentary perspective view similar to Figure 11 showing another method of using a wooden strip in the bottom of the runner.

Figure 14 is a partial perspective view of a pallet built in accordance with another embodiment of this invention.

Figure 15 is a partial plan view of the runner blank used in the structure shown in Figure 14.

Figure 16 is a partial perspective view showing the runner of Figure 14 assembled but before the wood members have been added thereto.

Figure 17 is a partial perspective view of a pallet built in accordance with another embodiment of this invention.

Figure 18 is a partial plan view of a runner blank used in the structure shown in Figure 17.

Figure 19 is a partial perspective view showing the runner of Figure 18 assembled but before the wood members have been added thereto.

Turning now to a specific description of the drawings by reference numbers, there is shown in Figures 1 and 2 a pallet constructed in accordance with the present invention. In general, the structure consists of a series of runners 15 and stringers 16. The runners of the pallet are constructed from the blank shown in Figure 2, generally designated 17, and suitably made from die-cut corrugated board. In this and other blanks, crease score lines are shown as dotted lines and cuts are shown as solid lines. The blank is of generally elongated rectangular form and near either edge thereof there is a crease score line 19. Equidistant from either side are two further score lines 21, which divide the blank into sidewall portions 23, and a bottom portion 25. Intersecting the crease score lines 21 are the shorter cuts 27, and at either end of these cuts are crease score lines 29. In addition, cuts 31 extend from the crease score line 19. When the stock is bent on the line 19, inwardly extending lips 33 are formed, which have outwardly extending tabs 35 thereon.

Although the pallet would normally be assembled by a machine, which will form a separate patent application, the blanks may be assembled by hand and the hand operation is described. In forming the blanks, the sidewall portions 23 are first bent upwardly from the bottom portion 25 and, simultaneously, pressure is exerted inwardly between the cuts 27, forming upstanding support members 37. A block of wood or similar material 39 is then dropped between the two thus-formed pairs of support members 37, and the members 37 hold the block 39 in an upright position. The topmost members of the blank 17 are then bent inwardly to form the lips 33, and this in turn causes the tabs 35 to turn outwardly, as is shown in Figure 1. Stringer members 41 are then inserted into the slots 43, which were formed when tabs 35 moved outwardly. In this manner, a sturdy pallet is produced and it will be noted that pressure on the top of the pallet will tend to make the lips 33 move outwardly, but that these will lock by a ratchet-like action on the members 41.

In this manner, there is formed a sturdy pallet, which does not employ nails, staples, or the like to hold it together. The pallet may then be used in the normal manner. If it is desired to refurbish the pallet, new cardboard runners 15 can be provided at low cost. Likewise, if the pallet is shipped to a distant point, it is frequently not economical to return the entire pallet for re-use. In this case, the wooden portions of the pallet may be easily removed, the carboard portions discarded, and only the wooden portions returned for re-use. Thus, only the relatively light-weight, low volume stringers 41 and blocks 39 would be returned and new carboard members 15 would be furnished for refurbishing the pallet.

In Figures 3 and 4, an alternate form of runner is employed. The blank 45 has score lines 19 and 21, as well as the cuts 31, heretofore described. However, the cuts traversing the fold lines 21 are different and consist of two cuts 47, at opposite sides of the fold line 21, and crease score lines 49. The crease score lines 49 and the cuts 47 form a generally diamond shaped pattern and, as the blank is assembled, these move upwardly, as is shown in Figure 4, forming support members 51 for the insertion of block 39. When blocks 39 are inserted, the creases 53 abut the blocks and hold the blocks firmly in place. The sidewall portions 55 form strong angling support members therefor.

In Figure 5, another alternate form of construction is shown wherein the blank 57 has the fold lines 19 and 21 and cuts 31, previously described, but wherein the method of supporting the blanks 39 is somewhat different. Here, one cut 59 extends at right angles and across the fold line 21 and a second cut 61 extends inwardly from the first. Score lines are provided, as is shown, so that they can be folded inwardly to form the supporting members 63, shown in Figure 6. It will be noted that in accordance with this embodiment, flat portions 65 are provided which are in contact with the block 39 over a substantial area.

In Figures 7 and 8, another embodiment is shown wherein the blank 67 has a circular cut 69, which can be pushed inwardly to form the upstanding members 71, as is shown in Figure 8.

In Figure 9, still another form of support member is shown wherein the two pairs of support members are not the same. In accordance with this embodiment, the blank 73 is provided with one set of cuts and scoring 75 and opposite sides are provided with cuts and scoring 77. These are folded inwardly to form the supporting members shown in Figure 10 and it will be noted that in this embodiment, the support block 39 does not run at right angles to the fold lines 21, as in the other embodiments, but runs on an angle thereto, as is shown in dotted lines. This embodiment is therefore particularly advantageous for its cross bracing action.

It is sometimes desirable to provide the runner with a wooden strip or other reinforcement. Two methods of accomplishing this are shown in Figures 11 and 13. In the embodiment shown in Figure 11, a wooden strip 79 is placed along the bottom of the runner and the wooden strip has rabbeted portions 81 for supporting block 39. In the form shown in Figure 13, wooden strip 83 is not rabbeted, but is narrow enough to fit between the support members 37. In either manner, greater strength and rigidity can be given to the pallet by the use of the wooden strips 79 or 83. Although the wooden strip has been shown illustrated with the embodiment of the invention shown in Figure 1, it is obvious that the wooden strips may be used with any of the other embodiments illustrated.

In Figure 12, an alternate method of assembly is shown. In accordance with this method, the top lip is not bent inward as at 33, but is bent outward to provide a flap 85. In turn, the tab 87 is bent inward. In many instances, it is desirable to assemble a pallet this way rather than in the manner shown in Figure 1.

In Figures 14, 15 and 16, an alternate form of the invention is shown. In accordance with this embodiment, the blank 89 is provided with the fold score lines 19 and modified cut lines 32 similar to the cut line 31, previously described. Here, however, the cut 32 extends outwardly into the stock as is shown, forming the small tabs 34 at either end of the slot, thus provided. When stringers are used which are slightly larger than the width of the slot, the tabs 34 tend to grip and hold the stringer. The fold line 21 is replaced by two separate lines 91 and 93, which are parallel to and near each other. Two cuts are made at 95, extending between the fold lines 91 and 93, and a third cut 97 extends between the cuts 95. The method of assembling this pallet is shown in Figures 14 and 16, and consists of bending upwardly on the side members. This allows two flaps 99 and 101 to extend from the side and bottom respectively of the runner and the block 39 is set into the opening which these flaps leave. If desired, in this embodiment of the invention, a bottom strip 103 may be employed.

It will be noted that in Figure 14 (left-hand side), the top 44 of the slot in the sidewall 23 is lower than the top of the block 39. Thus, when the stringers 41 are inserted, clearance is left between the stringer and the sidewalls so that wire, steel or cord may be passed therethrough to strap the load to the pallet. It will be noted that the end of the stringer 41 may be tapered, as at 46, to facilitate insertion.

Instead of the multiple blocks 39, one may use a single continuous support member extending through the runners.

In Figures 17, 18 and 19 still another form of the invention is shown. In accordance with this embodiment, the blank 102 is provided with a first set of fold score lines 104 and a second set of fold score lines 106. Additionally, the blank is provided with cut lines 108, 110, 112 and 114. The blank is then folded, as heretofore described in connection with the other blanks and as is shown in Figure 19. This produces the tabs 116 which extend into the channel thus formed and which serve to hold in place the blocks 39. Of course, stringer members 41 are employed as in the previous structures described. Also one may use a bottom strip 103. In this embodiment, it will be noted that as the flaps 116 are bent in, a slot 118 is formed and one may pass wires, ropes or straps through these slots to strap a load on the pallet.

The strip 103 may be placed on top of the support member 39 instead of below, as illustrated.

In any of the embodiments of the invention, the side walls of the runners may be perforated at suitable intervals to effect knock-out openings, permitting four-way fork entry of the pallet.

It is believed apparent from the foregoing that I have described a pallet which is strong, light, easy to assemble and disassemble and which may be easily refurbished by merely replacing the cardboard portions thereof.

This application is a continuation-in-part of application Serial No. 570,115, filed March 7, 1956, now abandoned.

I claim:

1. A pallet of the class described, comprising a series of runners made of cardboard or the like, each of said runners being of generally U-shaped cross section having bottom and side members, a series of rectangular blocks of wood resting on the bottom portion and extending upwardly to near the top of the U, a series of stringers made of wood or the like running at right angles to said runners, said stringers passing through slots in said side portion and resting on said blocks.

2. The structure of claim 1 wherein the runners are provided with a series of indentations adjacent the point of junction of the side and bottom members, said indentations gripping each side of the rectangular blocks and tending to hold the blocks upright.

3. The structure of claim 1 wherein a strip of wood is placed along the bottom of the U and supports the blocks.

4. The structure of claim 1 wherein the runners have outwardly directed tabs extending from near the top of the runners.

5. A pallet of the class described comprising a series of runners made of cardboard or the like, each of said runners being of generally U-shaped cross section having bottom and side members, said side members terminating in a pair of inwardly turned lips, a series of slots in said side members adjacent the line of junction between the side members and the inwardly turned lips, a series of stringers made of wood or the like running at right angles to said runners, said stringers passing through said slots and resting on blocks, said blocks extending upright from said bottom members.

6. A pallet of the class described comprising a series of runners made of cardboard or the like, each of said runners being of generally U-shaped cross section and having a flat bottom member, two intermediate side members extending upwardly at an angle of about 45° from said bottom member, side members extending upwardly from said intermediate side members, said side members being at approximately right angles to said bottom member, inwardly turned lips on each of said side members, slots at the point of junction of said side members and said inwardly turned lips, a series of stringers inserted in said slots and running at right angles to said runners, and a series of blocks located in the U-shaped runner, said blocks serving to support said stringers and extending from said bottom member to said stringers, and slots in said intermediate side members, said slots receiving corners of said blocks and tending to hold said blocks in an upright position.

7. A blank for forming a runner for a pallet comprising a flat sheet of cardboard of generally rectangular shape having a first pair of fold score lines parallel to the longer axis of the blank, said first set of score lines being equally spaced from the center of the blank, a second pair of score lines parallel the first pair of score lines and located near the edge thereof, cut lines adjacent said second pair of score lines forming slots and means cut from that portion of said blank between a score line of said first pair and an adjacent score line of said second pair adapted for holding a block in a given position when said pallet is assembled by supporting said block at either side thereof.

8. A blank for forming a runner for a pallet comprising a flat sheet of cardboard of generally rectangular shape having first and second fold lines spaced equally from and parallel to the center of the longer axis of the blank, third and fourth score lines spaced equally from and outside the first and second score lines and parallel thereto, and fifth and sixth score lines spaced outside the other score lines and extending parallel to the edges of the blank, pairs of cut lines at right angles to and extending between the first and third and between the second and fourth fold lines, at least a single cut joining each of said pair of parallel cut lines whereby to sever the cardboard strips so formed between said parallel cut lines, pairs of parallel cut lines extending inwardly from the fifth and sixth fold lines but terminating short of the third and fourth fold lines and at least a single cut perpendicular to each of said last-mentioned parallel cut lines joining each pair of said parallel cut lines whereby to form an area suitable for receipt of a wood stringer.

References Cited in the file of this patent

UNITED STATES PATENTS

| | | |
|---|---|---|
| 2,154,195 | Benoit | Apr. 11, 1939 |
| 2,293,361 | Roberts | Aug. 18, 1942 |
| 2,611,569 | Coleman | Sept. 23, 1952 |
| 2,721,689 | Nye | Oct. 25, 1955 |